(12) United States Patent
Rangavajjhala et al.

(10) Patent No.: US 11,410,098 B1
(45) Date of Patent: Aug. 9, 2022

(54) METHOD FOR COMPUTATIONAL MODELLING AND ANALYSIS OF THE SKILLS AND COMPETENCIES OF INDIVIDUALS

(71) Applicant: Epixego Inc., Fremont, CA (US)

(72) Inventors: Venkata Subbaiah Rangavajjhala, Fremont, CA (US); Anita Balaraman, Fremont, CA (US)

(73) Assignee: Epixego Inc., Fremont, CA (US)

( * ) Notice: Subject to any disclaimer, the term of this patent is extended or adjusted under 35 U.S.C. 154(b) by 0 days.

(21) Appl. No.: 16/672,153

(22) Filed: Nov. 1, 2019

Related U.S. Application Data (60) Provisional application No. 62/755,135, filed on Nov. 2, 2018.

(51) Int. Cl.
*G06Q 10/00* (2012.01)
*G06Q 10/06* (2012.01)
*G06F 16/2457* (2019.01)

(52) U.S. Cl.
CPC .......... *G06Q 10/063112* (2013.01); *G06F 16/24578* (2019.01)

(58) Field of Classification Search
None
See application file for complete search history.

(56) References Cited

U.S. PATENT DOCUMENTS

| | | | | |
|---|---|---|---|---|
| 9,639,827 B1 * | 5/2017 | Li | .......... | H04L 67/306 |
| 10,380,553 B2 * | 8/2019 | Li | .......... | G06F 16/951 |
| 10,713,283 B2 * | 7/2020 | Ebrahim | .......... | G06F 16/355 |
| 2006/0078863 A1 * | 4/2006 | Coleman | .......... | G09B 7/02 434/322 |
| 2012/0197733 A1 * | 8/2012 | Skomoroch | .......... | G06Q 30/02 705/14.66 |
| 2012/0197863 A1 * | 8/2012 | Skomoroch | .......... | G06Q 30/02 707/E17.108 |
| 2012/0197993 A1 * | 8/2012 | Skomoroch | .......... | G06Q 30/02 709/204 |
| 2013/0224697 A1 * | 8/2013 | McCallum | .......... | G09B 7/04 434/188 |
| 2014/0081928 A1 * | 3/2014 | Skomoroch | .......... | G06F 16/335 707/692 |
| 2014/0222746 A1 * | 8/2014 | Gobert | .......... | G06N 5/022 706/47 |

(Continued)

OTHER PUBLICATIONS

Gillwater, Shannon, Relationship Mapping: How To Do It Right, Oct. 24, 2018, LinkedIn, https://www.linkedin.com/pulse/relationship-mapping-how-do-right-sharon-gillenwater, p. 1-8. (Year: 2018).*

*Primary Examiner* — Joseph M Waesco
(74) *Attorney, Agent, or Firm* — Bekiares Eliezer LLP (57) ABSTRACT

A method and system capture and analyze information regarding an individual's background, capabilities, and interests into a skills genome. A genome may be a unique structured profile containing a set of skills of an individual. The information captured would reflect the essence of an individual's interests as well as skills acquired over their lifetime. The genome may be used in analysis between multiple users to compare the strength of connections to skills. In an exemplary application, candidates for a skill based position may be identified by the system based on the relative strength of skills they possess that are salient to the position.

9 Claims, 4 Drawing Sheets

(56) References Cited

U.S. PATENT DOCUMENTS

| | | | |
|---|---|---|---|
| 2015/0088568 A1* | 3/2015 | Lambroschini | ............................ G06Q 10/063112 705/7.14 |
| 2015/0120714 A1* | 4/2015 | Xu | .................... G06F 16/24578 707/723 |
| 2017/0111503 A1* | 4/2017 | McGann | ............. H04M 3/5235 |
| 2017/0213179 A1* | 7/2017 | Schissel | ................. H04L 67/10 |
| 2018/0158010 A1* | 6/2018 | Greenberger | .. G06Q 10/063112 |
| 2018/0285824 A1* | 10/2018 | Kenthapadi | ............ G06Q 50/01 |
| 2018/0293485 A1* | 10/2018 | Merhav | .................... G06N 3/04 |
| 2019/0188742 A1* | 6/2019 | Vasudevan | ......... G06Q 30/0204 |
| 2019/0220547 A1* | 7/2019 | Chen | .................. G06F 16/9024 |
| 2020/0311683 A1* | 10/2020 | Chua | ................. G06Q 10/1053 |

* cited by examiner

| HIGH SCHOOL ACADEMIC | COURSES, PROJECTS , ETC. |
|---|---|
| HIGH SCHOOL EXTRACURRICULAR | SPORTS, MUSIC, DEBATE, VOLUNTEERISM, ETC. | o o o

| COLLEGE ACADEMIC | COURSES, PROJECTS, ETC. |
|---|---|
| COLLEGE EXTRACURRICULAR | SPORTS, MUSIC, DEBATE, VOLUNTEERISM, ETC. | o o o

| PROFESSIONAL | ROLES HELD, PROJECTS, ETC. |
|---|---|
| PROFESSIONAL INTERESTS | MEMBERSHIPS, VOLUNTEERISM, ETC. |

METHOD FOR COMPUTATIONAL MODELLING AND ANALYSIS OF THE SKILLS AND COMPETENCIES OF INDIVIDUALS

CROSS-REFERENCE TO RELATED APPLICATIONS

This application claims benefit under 35 U.S.C. § 119(e) of U.S. Provisional Application having Ser. No. 62/755,135 filed Nov. 2, 2018, which is hereby incorporated by reference herein in its entirety.

BACKGROUND

The embodiments herein relate generally to organizing data structures, and more particularly, to a method for computational modelling and analysis of the skills and competencies of individuals.

Capturing one's capabilities and interests forms the foundation for marketing oneself as well as for planning for future career development. Being able to analyze these skills in relation to others is critical for career planning and development. The standard format for capturing this information (for example, a resume) is unstructured and requires manual processing that doesn't scale well. Automated techniques based on keyword-match miss broader interests and competencies, producing poor results.

Other techniques are unable to look past the individual skill descriptions listed in the resume (for example "Calculus" or "Piano" which only give a vague idea of the skill) to even broader competencies listed (for example, "Math" or "Music"). Additionally, these textual processing methods are not very efficient and require vast computing power to identify for example, candidates for an employment position.

As can be seen there is a need for automating the organizing and analysis of individuals' skills to provide better matching of individuals to positions based on their individual skills.

SUMMARY

In one aspect of the present invention, a computer program product for generating a structured profile containing a set of skills of an individual is disclosed. The computer program product comprises a non-transitory computer readable storage medium having computer readable program code embodied therewith. The computer readable program code is configured to: capture a users' personal data; extract skills from the captured personal data; assemble the extracted skills into a skills genome map associated with each of the users; identify connections between the extracted skills of the users; and encode the extracted skills into a first data structure having a plurality of nodes representing the users.

In another aspect, a method for generating a structured profile containing a set of skills of an individual is disclosed. The method comprises: capturing a users' personal data; extracting skills from the captured personal data; assembling the extracted skills into a skills genome map associated with each of the users; identifying connections between the extracted skills of the users; and encoding the extracted skills into a first data structure having a plurality of nodes representing the users.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

The terminology used herein is for the purpose of describing particular embodiments only and is not intended to be limiting of the invention. Unless otherwise defined, all terms (including technical and scientific terms) used herein have the same meaning as commonly understood by one having ordinary skill in the art of which this invention belongs. It will be further understood that terms, such as those defined in commonly used dictionaries, should be interpreted as having a meaning that is consistent with their meaning in the context of the relevant art and the present disclosure and will not be interpreted in the idealized or overly formal sense unless expressly so defined herein.

In describing the invention, it will be understood that a number of techniques and steps are disclosed. Each of these has individual benefits and each can be used in conjunction with one or more of the disclosed techniques. Accordingly, for the sake of clarity, this description will refrain from repeating every possible combination. Nevertheless, the specification and claims should be read with the understanding that such combinations are entirely within the scope of the invention and the claims.

In general, embodiments of the disclosed subject technology provide a method and systems for capturing and analyzing information regarding an individual's background, capabilities and interests in a skills genome. "Genome" as used herein refers to a unique structured profile containing a set of skills of an individual. The information captured would reflect the essence of an individual's interests as well as skills acquired over their lifetime.

In exemplary embodiments, a system may include a method to capture details of an individual's skills and interests in a structured format and a database for storing the data. The system may further include a processor to extract salient skill elements, identify connections between skill elements and encode them into a data structure having a plurality of nodes representing individuals, a plurality of nodes representing skill elements and a plurality of connections between. The system may further include application processors that use the data structures so created, to identify similarities between them and rank them in order of closest match. In one exemplary application, these results can be used to guide individuals to build on their existing skills. In another exemplary application, the results can be used to locate the best-suited candidates for job functions/employment positions.

Figure 1:
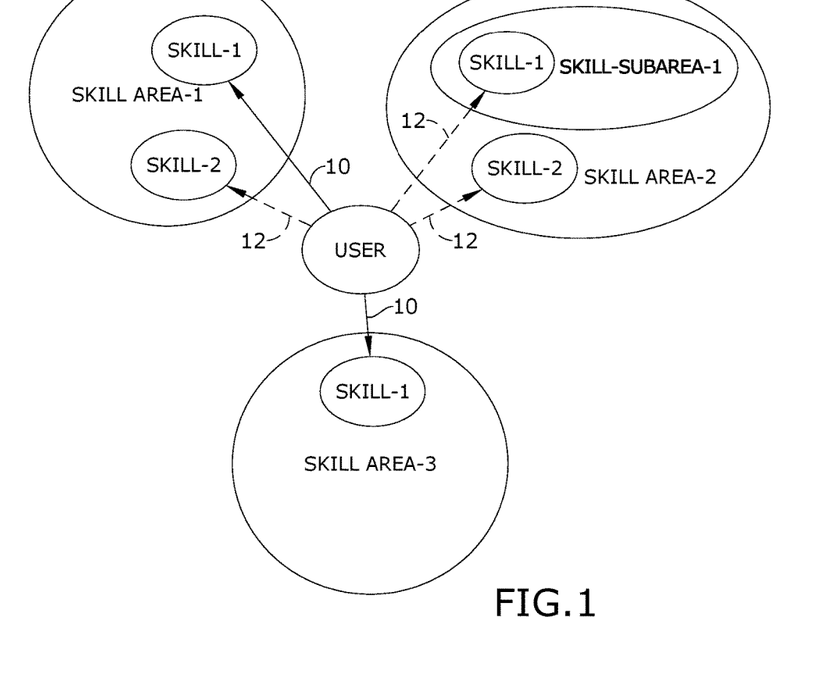
FIG. 1 is a diagrammatic view of a skills genome map according to an embodiment of the subject technology.

Referring now to FIG. 1, an exemplary representation of a skills genome derived from data presented by a user is shown according to an embodiment. The skills genome may have a hierarchical structure with individual skills grouped under broader skill sub-areas and further under skill areas. As the figure illustrates, a user may have a strong link 10 or a weak link 12 to a skill. The weight of a connection to a skill is also an attribute of the skills genome. The weight of a connection to a skill-subarea may be the summation of the weights of the connections to individual skills encompassed in the skill sub-area. Similarly, the weight of a connection to a broader skill area may be the summation of the weights of the connections to individual skill sub-areas encompassed in the skill area. The weights may be normalized to have a cumulative value, for example, of 1, across all skill areas. The normalization may then be propagated to lower hierarchy levels.

In addition to actual experiences contributing to the weights of the links an individual has for a skill, their interests may also be used in deriving the composite connection weights. In this way, the skills genome embodies all the experiences and interests of the individual in one exemplary embodiment. In another exemplary embodiment, the skills genome can embody the skills sought by employers for positions in their firms. It will be understood that the term 'user' is not specific to individuals, but can apply more broadly to any organization or description that can be represented with a skills genome structure.

Figure 2:
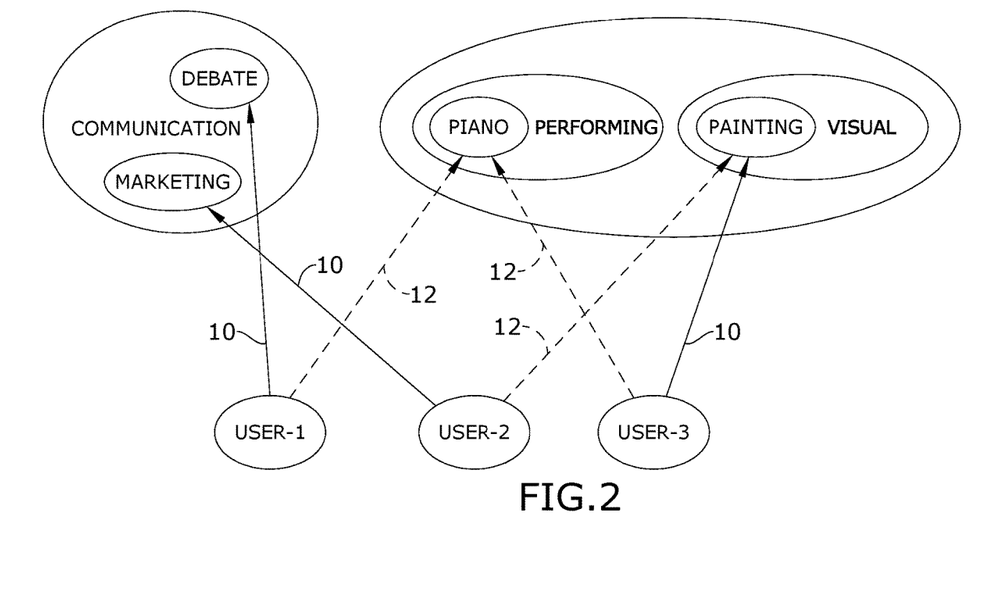
FIG. 2 is a diagrammatic view of multiple users' interconnected skill relationships according to an embodiment of the subject technology.

FIG. 2 depicts an exemplary representation of the broader graph database with multiple users, showing the interconnectivity between users. It will be noted that meaningful connections between users may be extracted by analyzing the edges they share with individual skills as well as skill-groups. The strength of the connection between users may be the totality of all edges shared by them, taking the intersection of edge weights and the hierarchy of the data model also into consideration. For instance, with reference to this figure, user-2 shares a close relationship with user-1 at the 'communications' level of hierarchy, but none at the individual leaf skill levels.

Further, while user-2 shares a relationship with user-3 at the leaf skill level (Painting), it isn't very strong since user-2 only has a weak proficiency in that skill. When comparing the overall abilities of user-2 with user-1 and user-3, it can be surmised that user-2 shares a stronger skills-relationship with user-1. This is despite the fact that user-2 and user-1 do not share any common leaf-level skills, while user-2 and user-3 do. This insight leads to very meaningful results in matching users based on their overall skills profile and differentiates the skills-genome approach from rival methods that give preference to exact keyword matches.

Figure 3:
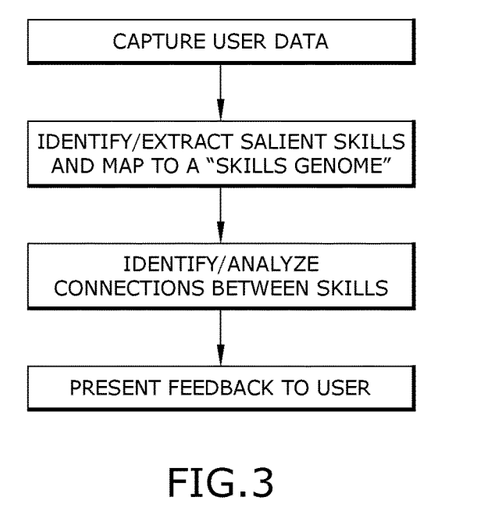
FIG. 3 is a flowchart of a method of data capture and feedback presentation according to an embodiment of the subject technology.

FIG. 3 depicts an exemplary process flow to capture, analyze and present feedback to users. The flow diagram illustrates the virtuous cycle of information gathering, extraction of skills and interests, finding connections with others based on the extracted skills genome, presenting relevant and useful feedback to the user in order to guide the user to take steps to further his/her skills and feed them back to the system.

The first phase of the process is to capture a user's background and interests via a carefully designed questionnaire. The questionnaire not only collects information on the current skill set of a user, but also their likes and dislikes developed over the course of their formative years.

Figure 4:
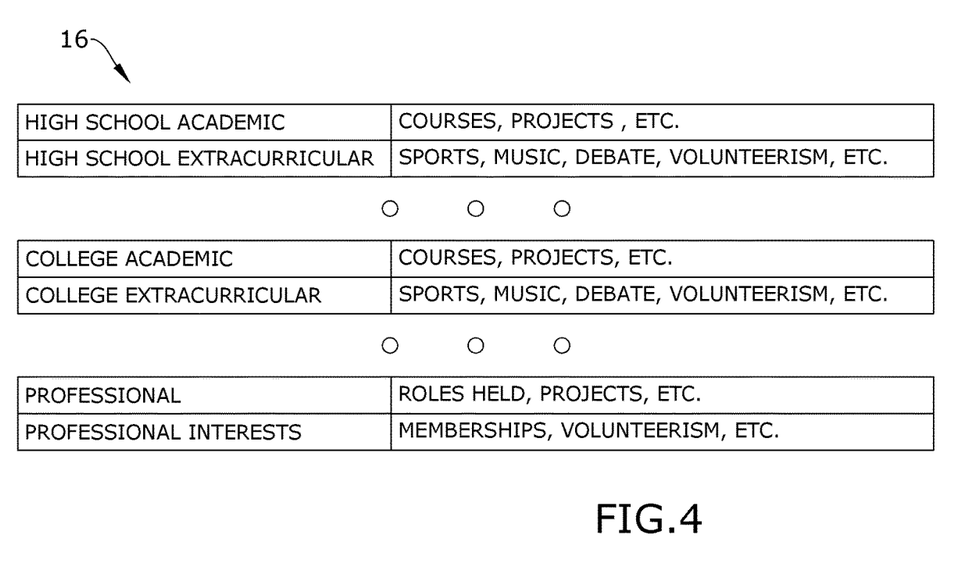
FIG. 4 is a schematic view of a questionnaire according to an embodiment of the subject technology.

The information requested and collected is in human-readable format and may be unstructured. This is illustrated via an exemplary form 16 in FIG. 4.

Figure 5:
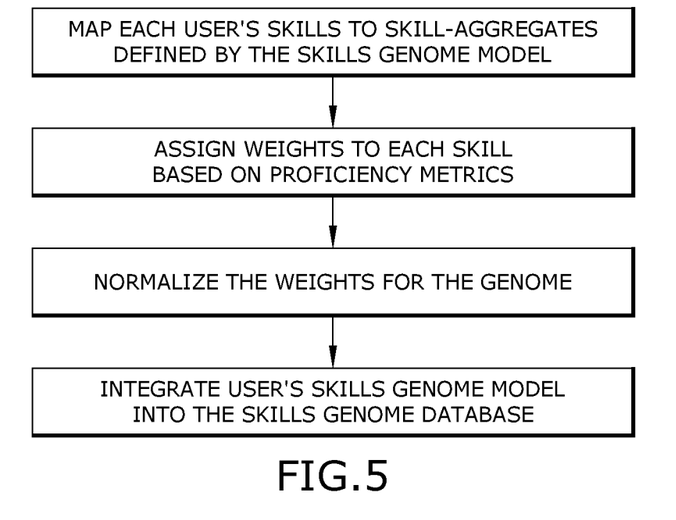
FIG. 5 is a flowchart of a method of creating a skills genome data model for users according to an embodiment of the subject technology.

The second phase of the process may include programmatically extracting salient skills and interests information from the unstructured data to create a normalized skills fingerprint—the skills genome. This is illustrated via an exemplary process in FIG. 5. The steps may, for example, include:

Using the rules defined by the skills-genome ontology, create the skills genome for the user by mapping user skills collected in Phase 1 to skill-aggregates defined by skills genome;

Assign edge weights for the user skills genome based on proficiency metrics. Proficiency metrics may be a function of intensity of involvement in a skill, the duration spent developing the skill as well as position/title/grade achieved in the skill;

The skills genome model for the user may be normalized in order to prepare it for the next step;

Integrate the user skills genome into the wider skills genome database to connect the user with the broader population.

The third phase of the process may identify and analyze connections between skills genomes across the entire population. In one exemplary scenario, comparison within a population of individuals would result in like-minded individuals following a similar path in their career development. In another exemplary scenario, comparison of an individual's skills genome with a collection of genomes representing job/internship opportunities at firms could result in matching available job/internship opportunities suited to that individual. Inversely, matching a skills genome for a job position within a firm with a collection of skills genomes for individuals may result in matching candidates with a particular job/internship opportunity.

Figure 6:
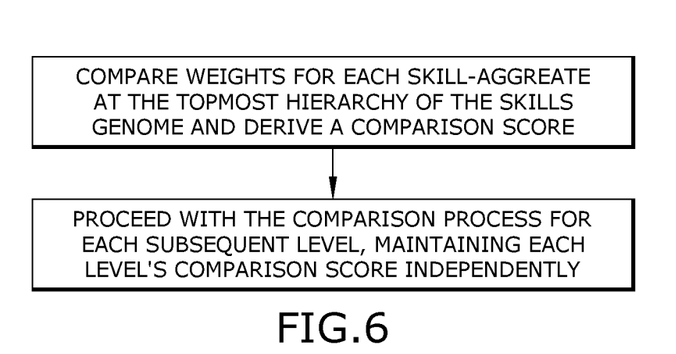
FIG. 6 is a flowchart of a process of for comparison of skills genomes for multiple users according to an embodiment of the subject technology.

FIG. 6 shows a process to compare two users according to an exemplary embodiment. Analysis may proceed hierarchically down starting with the highest skills-aggregate, followed by skill sub-area matching and finally leading to individual skill-matching. The matching score metric may be maintained independently for every level.

Figure 7:
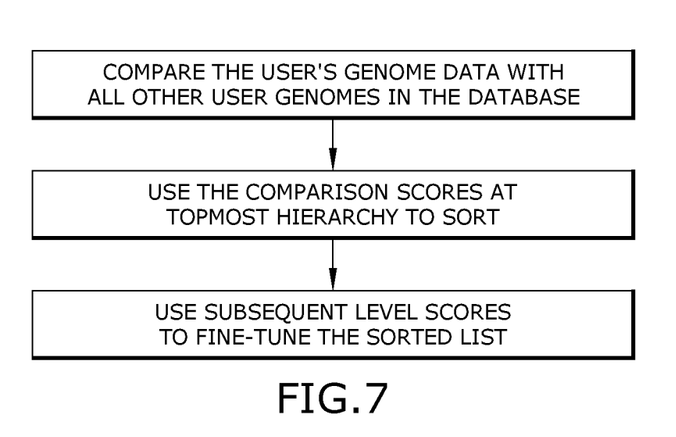
FIG. 7 is a flowchart of a process for conducting a skills-genome match analysis for a given user according to an embodiment of the subject technology.

FIG. 7 shows a process to match a given user with other users in the database to find the closest match, based on their skills genome according to an exemplary embodiment. As the number of users in the database scales to millions, the significance of skills-genome's structured data model becomes critical for scale and performance.

The steps of the process in FIG. 7 may include:

Repeat the matching process between two users, from FIG. 6, between the chosen user and all other users in the database.

Perform an initial sort based on comparison scores for the 'highest' level of skills genome model hierarchy. This criterion is based on insights derived from cognitive psychology which indicate that higher level competence, based on skill aggregates, is a more relevant marker for comparing the abilities of two individuals, rather than individual skills. This is unique to skills genome and differentiates its analysis method with those that use matching keywords, which by definition would be bottom-up analysis.

Use match scores from subsequent levels to fine tune the sorted list and break ties. This approach reduces the priority given to skill sub-areas down the hierarchy leading up to the least priority given to individual skill matches. This again, fits in with the skills-genome philosophy of matching individuals based on their competencies.

The results of the analysis may be presented to the user in a human-readable format. An example report is shown in Table 1.

TABLE 1

MATCHES FOUND

PROFILE-1
PROFILE-2

In one embodiment, when the user is an individual, this feedback can then be used by the user to plan and take the next steps toward their skills development.

Following such a development, users can then update their skills data and trigger another round of the process flow. In another embodiment, when the user is a job/internship position at a firm, the feedback can be used to plan and take the next steps toward filling that position.

Figure 8:
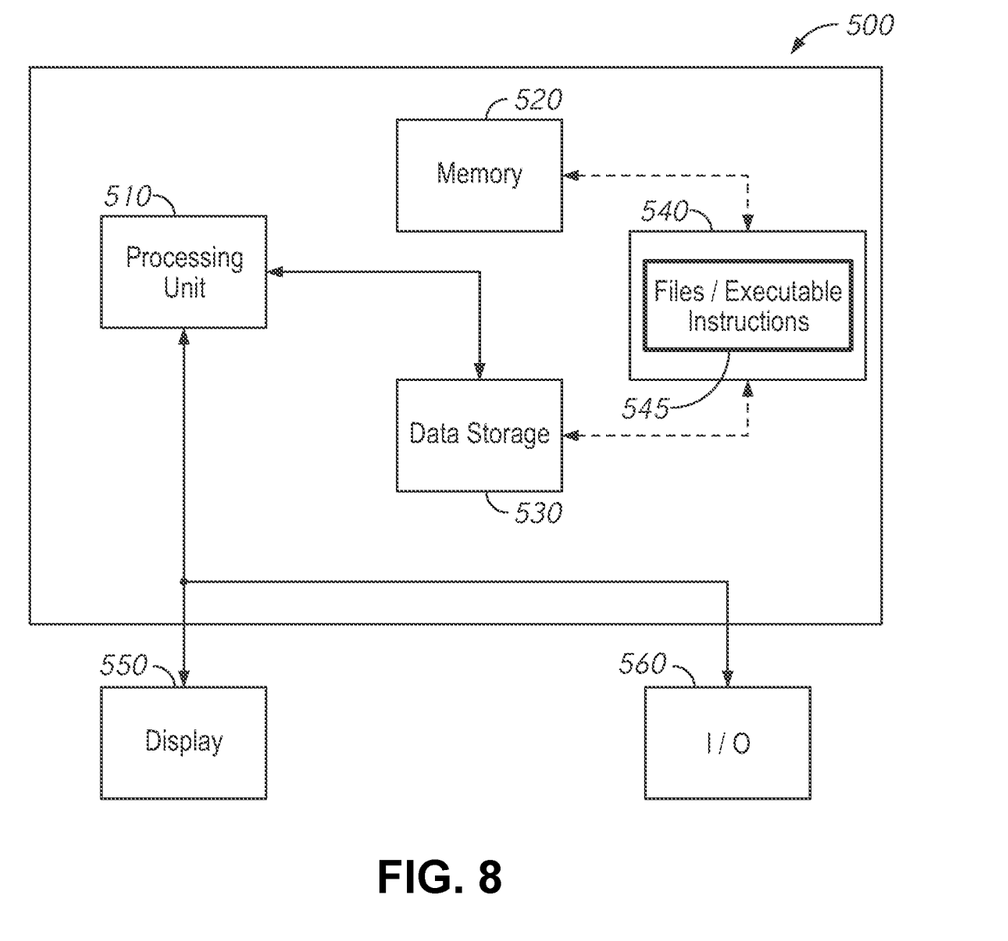
FIG. 8 is a block diagram of a computing device according to an embodiment of the subject technology.

A computing device 500, shown according to an exemplary embodiment in FIG. 8, may be for example, a computer system or a computer server. The computing device 500 is an example of a machine operating under the steps of the processes described above. As will be appreciated, some aspects of the embodiments disclosed above may turn the computing device 500 into a special purpose computer system. For example, in the role of a host server, the computing device 500 may implement for example the functions of receiving input of users' skills, aggregating the skills information for each user, analyzing each user's skills for importance and weighting, generating the mapping of each user's genome, generating genome relationships between multiple users, and identifying user profiles that match a skill set needed by a third party. In the role of a user device, the computing device 500 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics, which may receive user's input through a user interface (UI) and provide users with displayed results from inquiries and dashboards showing information related to their accounts.

The components of the computing device 500, may include, but are not limited to, one or more processors or processing units 510, a system memory 520, data storage 530, a computer program product 540 having a set of program modules 545 including files and executable instructions, and a bus system that couples various system components including the system memory 520 to the processor(s) 510. The memory storage 520 may store for example, the skills and genome maps of each user and genome relationships for a requested skill set.

The computing device 500 may be described in the general context of computer system executable instructions, such as the program modules 545 which represent a software embodiment of the system and processes described generally above. The program modules 545 generally carry out the functions and/or methodologies of embodiments as described above. The computing device 500 may typically include a variety of computer system readable media. The system memory 520 could include one or more computer system readable media in the form of volatile memory, such as a random-access memory (RAM) and/or a cache memory. By way of example only, the data storage system 530 may read from and write to a non-removable, non-volatile magnetic media device. The system memory 520 may include at least one program product 540 having a set of program modules 545 that are configured to carry out the functions of embodiments of the invention in the form of computer executable instructions. The program product/utility 540 may be stored in the system memory 520 by way of example, one or more application programs, other program modules, and program data.

The computing device 500 may communicate with one or more external devices including for example, an electronic display 550. User input into the display 550 may be registered at the processor 510 and processed accordingly. Other devices may enable the computing device 500 to communicate with one or more other computing devices, either by hardwire or wirelessly. Such communication can occur via Input/Output (I/O) interfaces/ports 560.

The computing device 500, through the I/O interface/ports 560, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 500 may be a cloud computing node connected to a cloud computing network (not shown). The computer computing device 500 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 550 which may be controlled via direct contact with the display 550 or via the I/O interfaces 560 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 510 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer program product for generating a structured profile containing a set of skills of an individual for matching with job positions, the computer program product comprising a non-transitory computer readable storage medium having computer readable program code embodied therewith, the computer readable program code being configured, when executed by a computer processor, to:
   capture personal data associated with a plurality of users through one or more user interfaces;
   extract skills from the captured personal data associated with at least one of the plurality of users', by the computer processor;
   encode the extracted skills into a data structure having a plurality of nodes representing individuals from among the plurality of users;
   assemble the extracted skills into a skills genome map associated with each user of the plurality of users using the data structures, wherein:
      the skills genome map includes hierarchical groups of the extracted skills,
      the hierarchical groups are arranged in a plurality of skill areas and skill sub-areas, the sub-skill areas are associated with the plurality of the skill areas, wherein the skill sub-areas comprise individual instances of the extracted skills;
   identify connections between the extracted skills of the users to the skill areas and to the skill sub-areas;
   assign a weighting value to each of the identified connections;
   determine a weight for each connection of the identified connections to the skill sub-area, wherein the weight of the connection to the skill sub-areas is a summation of weighting values of the connections to the individual skills in each of the skill sub-areas;
   determine a strength for the connection to the skill area and the skill sub-area for each user;
   match a job position to at least one of the users based on the strength of connections to the skill areas or the skill sub-areas of the user;
   construct a depiction of the genome map from the data structure comprising the plurality of nodes representing individuals from among the plurality of users, wherein the depiction of the genome map comprises:
   the extracted skills,
   the hierarchical groups,
   the skill areas,
   the skill sub-areas, and
   the identified connections between the extracted skills of the users to at least one of the skill areas and the skill sub-areas,
      wherein the depiction of the identified connections on the genome map is associated with the determined weight of the identified connections,
      wherein the connections between the user and the skill sub-area comprises the individual instances of the extracted skills, and
      wherein the connections between the user and the skill areas comprise a summation of the sub-skill areas associated with the skill area; and
   display in a dashboard, the dashboard comprising the depiction of the genome map on of one of the one or more user interfaces, the job position matched to the user based on the strength of connections to skill areas or skill sub-areas of the user, in a human readable report on an electronic display device.

2. The computer program product of claim 1, further comprising the computer readable program code configured to:
   identify similarities between the identified connections and between the users; and
   rank the identified similarities of identified connections and users in order of a closest match.

3. The computer program product of claim 2, further comprising the computer readable program code configured to: locate a best-suited candidate for a job function or employment position based on the ranked identified similarities of identified connections and users.

4. The computer program product of claim 1, further comprising computer readable code configured to:
   identify a link to the skill area as strong or as weak; and
   assign a connection weight to a user's connection to the skill area based on the link to the skill area being strong or weak.

5. A method for generating a structured profile containing a set of skills of an individual for matching to a candidate position, comprising:
   capturing personal data associated with a plurality of users through one or more user interfaces;
   extracting, by a processor, interests and experiences associated with each user of the plurality of users from the captured personal data associated with each user of the plurality of users;
   determining, by the processor, skills and skill areas for each of the user's of the plurality of users from the extracted interests and the extracted experiences;
   assembling the skills into a skills genome map of the skills and the skill areas associated with each of the users;
   identifying connections between the users based on the skills and the skill areas shared between the users;
   assigning a weighting value to each of the identified connections;
   encoding the skills, the skill areas, the identified connections, and the weighting value of each of the identified connections into a first data structure having a plurality of nodes representing each of the users;
   determining a strength of each of the identified connections to each skill and skill area based on the weighting value for each of the identified connections;
   determining, by the processor, a set of candidates matched for a position based on which candidates have a highest ranking strength of connection to one or more skills or skill areas for the position;
   constructing a depiction of the genome map from the plurality of users' captured personal data, the determination of the skills and the skill areas, the assembled genome map, and the identified connections between the users,
      wherein constructing the depiction of the identified connections on the depiction of the genome map corresponds to the determined strength of the identified connections; and
   displaying the depiction of the genome map on one of the one or more user interfaces, wherein displaying the depiction of the genome map comprises:
      displaying the set of candidates matched to the position,
      displaying the strength of the connection to each of the skills and eachof the skill areas for each candidate, and
   generating a human readable report on an electronic display device corresponding to the constructed depiction of the genome map.

6. The method of claim 5, further comprising:
encoding the identified connections between the extracted skills of the users into a second data structure representing the identified connections;
   identifying similarities between the identified connections and between the users; and
   ranking the identified similarities of identified connections and users in order of a closest match.

7. The method of claim 6, further comprising:
locating a best-suited candidate for a job function or employment position based on the ranked identified similarities of identified connections and users.

8. The method of claim 5, further comprising:
identifying a link to the skill area as strong or as weak; and
assigning a weight to each user of the plurality of users to the skill area based on the link to the skill area being strong or weak.

9. The method of claim 5, wherein the assigned weighting value to each user of the plurality of user connection to the skill area is a summation of weights of connections to each of the skill sub-areas encompassed in the skill area.

\* \* \* \* \*